Sept. 29, 1925.

G. B. McLEAN 1,555,132

WEIGHING AND PACKING APPARATUS

Filed Oct. 11, 1922

INVENTOR
Guy B McLean
BY
Millen Henry & Boyken
ATTORNEYS

Sept. 29, 1925.   1,555,132
G. B. McLEAN
WEIGHING AND PACKING APPARATUS
Filed Oct. 11, 1922   3 Sheets-Sheet 3

INVENTOR
Guy B McLean
BY
Miller Henry Boykin
ATTORNEYS

Patented Sept. 29, 1925.

1,555,132

UNITED STATES PATENT OFFICE.

GUY B. McLEAN, OF FRESNO, CALIFORNIA, ASSIGNOR OF ONE-THIRD TO THOMAS B. HUNTER, OF SAN FRANCISCO, CALIFORNIA.

WEIGHING AND PACKING APPARATUS.

Application filed October 11, 1922. Serial No. 593,852.

*To all whom it may concern:*

Be it known that I, GUY B. McLEAN, a citizen of the United States, and a resident of the city and county of Fresno, State of California, have invented new and useful Improvements in Weighing and Packing Apparatus, of which the following is a specification.

My invention has for one of its objects mechanism for weighing raisins, dried fruits or any other commodity during the placing or packing operations in boxes or other containers, and is particularly adapted to bulk weighing.

Another object is means preventing the passing of any of the material to be packed, unless a box or container is in the proper receiving position.

Another object is the weighing of the material with accuracy before it is placed in the container.

Another object is feeding mechanism by which the material may be fed with relative rapidity until the required weight is nearly reached, after which the rate of feed may be reduced until the final accurate weight of material has been separated ready for transfer to the container.

Another object is apparatus especially adapted to piece work operation.

Other objects will appear from the drawings and specifications which follow.

In the following drawings and description is shown my invention as applied particularly to the weighing and packing of raisins into bulk containers, as for example, in 25 or 50 lb. packages and it will be apparent to those skilled in the art, from my description below, that changes may be made in the size and arrangement of the parts for the weighing and packing of raisins or for other commodities or material, to suit the individual requirements in any case, or the taste or desires of the builder, without departing from the spirit of my invention, and I wish to be understood as claiming all such variations.

Referring to the drawings.

Throughout the figures, similar numerals refer to identical parts.

Figure 1:
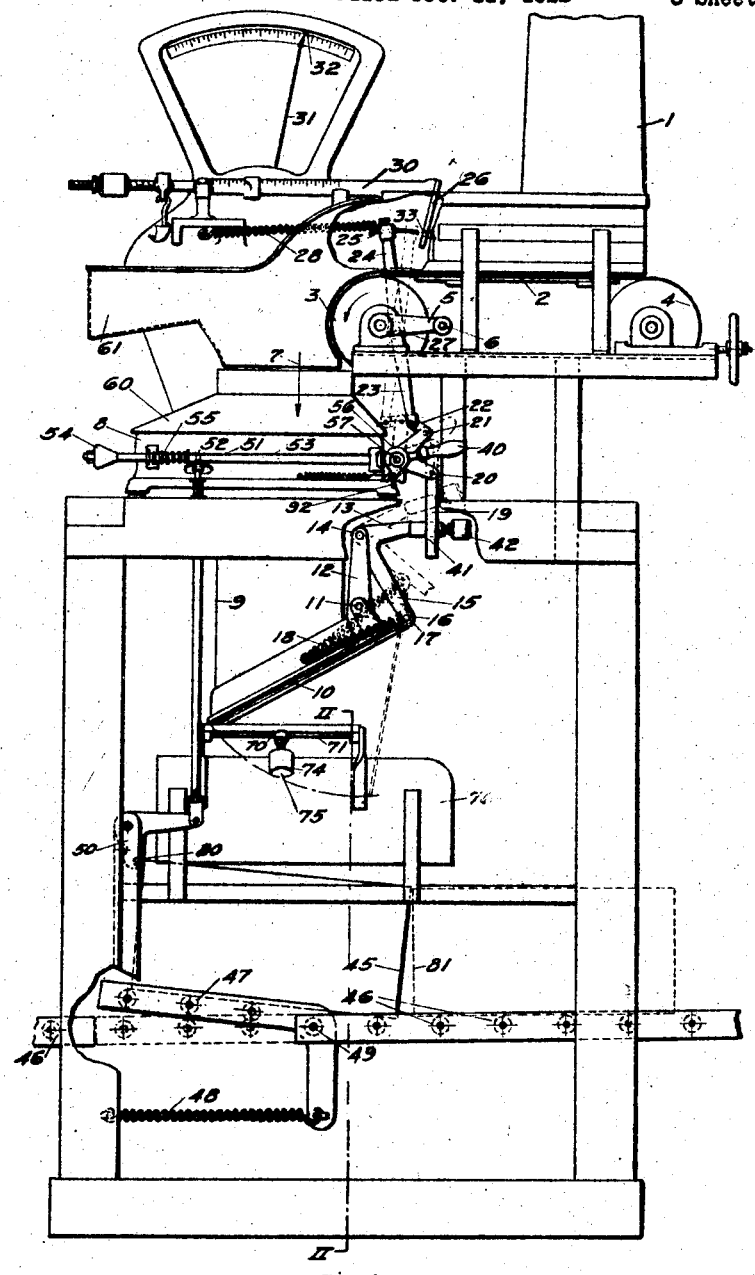
Figure 1 is a side view, showing my invention somewhat diagrammatically for the purpose of clearly illustrating the combination of the elements and their parts.

The numeral 1 indicates a chute or delivery member by which the raisins to be packed are delivered to the feeding member 2, which is here shown as an endless belt mounted to travel over pulleys 3, 4, by the action of the crank 5 and operating handle 6, but any well known power means may be substituted for the hand operation if desired, in which latter case it is advisable to employ speed varying means, not shown but well known, whereby the rate of material fed from the belt 2 may be varied at the will of the operator.

The material traveling on the belt 2 falls in the direction of the arrow 7 through an opening in the scale base 8 and into the hopper 9 against the sloping hinged bottom 10. This bottom member is hinged at 11 on the bracket 12 and on the upper end of which is pivoted the bell crank 13 on the pivot 14. The bell crank 13 has a lower projecting arm 15 adapted to normally lock against the roller 16 carried on the pivot 17. The pivot 17 is fixed on the projecting end of the bottom 10, and when the arm 15 releases the roller the latter rides upon the inner edge of the arm 15 as the bottom swings open on the axis 11, all as shown by the dotted lines. The downward movement of the bottom presses the spring 18 whose other end is attached to a fixed portion of the structure 9.

Fixed to the end of the pivot 17 or adjacent thereto, is tension spring 18, whereby the bottom 10 is normally held in a closed position. When the bottom 10 opens downward, it will be noted that the spring 18, being below the pivotal axis 11, exerts a pressure tending to close the bottom 10 against the hopper 9. The bell crank arm 13 extends within the range of movement of the latch or loop 19, which, upon being raised, moves the bell crank about the pivot 14, causing the arm 15 to clear the roller 16 and thus unlock the bottom 10 permitting it to freely drop under the action of the weight of the contents in the hopper 9, and after said contents have been discharged from the hopper 9, the tension of the spring 18 again closes the bottom 10 and the arm 15 locks the bottom in said closed position, it being understood that the latch 19 at such times is in the full line position of Fig. 1, clearing the arm 13.

The inter-locking mechanism, by which the dumping of the hopper 9 is prevented, except when the correct weight of material has been measured into the said hopper, includes the roller 16, bell crank 13, 15, latch 19, levers 20, 21, toggle link 22, double lever 23, 24, latch 25 and precision lock member 26. The double lever 23, 24, is pivoted at 27 and normally held in the full line position shown in Fig. 1 by the spring 28. The precision lock 26 is carried upon the scale beam 30, which latter counter balances the hopper 9 with its predetermined weight of contents when in the position shown in Fig. 1.

The details of the scale mechanism are not shown but are well known, and it is to be understood that the pointer 31 or its equivalent, indicates clearly to the operator the weight of the contents which may have been measured into the hopper 9 at any instant of time; and when the contents have been fed from the belt 2 into the hopper 9 until the desired weight is reached, or when the pointer 31 arrives at the calibration 32, the opening 33 of the precision lock 26 aligns with the latch 25, permitting the lever 23, 24, to take up the dotted position, whereby the link 22, levers 21, 20, latch 19, bell crank lever 13, 15, may be shifted into their dotted positions, thus unlocking roller 16 and bottom 10, which, under the weight of the weighed contents in the hopper 9, now opens, permitting the contents to be discharged freely downward. It is to be noted that this bottom will not be unlocked except when the opening 33 in the precision lock 26 occupies a predetermined position corresponding with the desired weight and enabling the latch 25 to clearly pass therethrough, as at no other time can the arm 15 be moved away from the roller 16.

The handle 40 is employed by the operator to actuate the parts just described and during the period of weighing, it will be noticed that latch 19 hangs free from arm 13 by a clearance space as at 41, so that the hopper with its bottom and associated connections up to and including arm 13 and such parts as are suspended from the scale mechanism, are not interfered with by the latch 19 and other parts shown there above.

Figure 5:
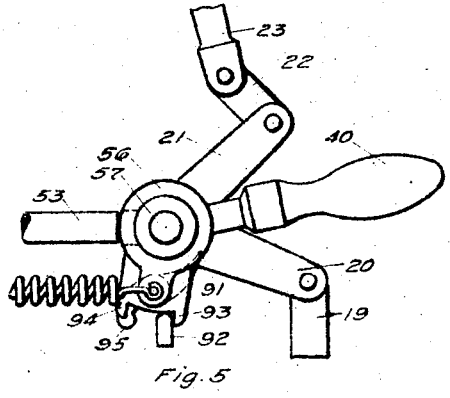
Fig. 5 is an enlarged detail of certain of the parts of Fig. 3.
Figure 3:
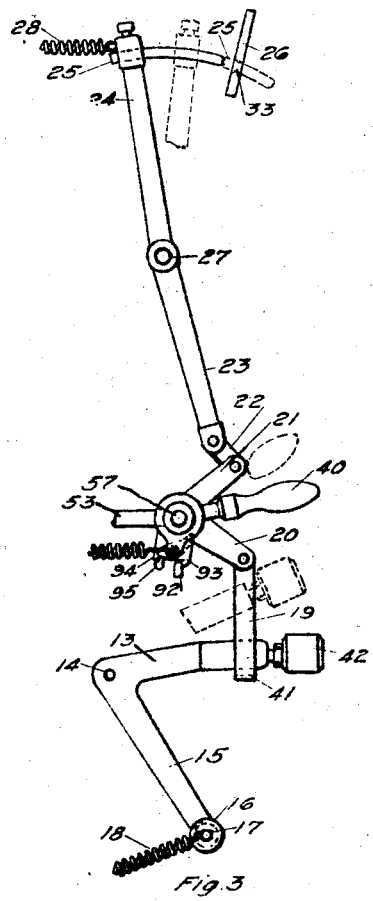
Fig. 3 is a detail of the lever mechanism of Fig. 1 on a larger scale.
Figure 4:
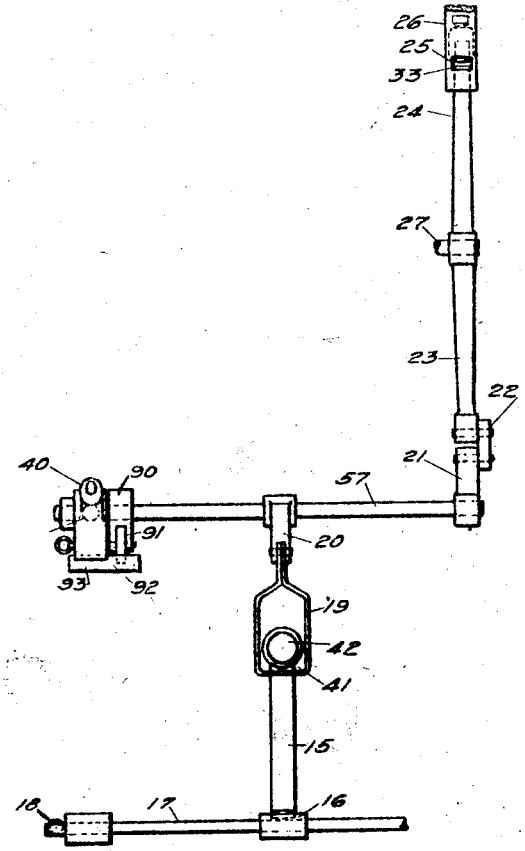
Fig. 4 is an end view of Fig. 3.

Assuming that it is desired to empty the weighed contents of hopper 9 into the container 45 the action which will take place in the lever mechanism will then best be understood by referring to Figs. 3, 4, 5. The operator withdraws the pin 53 by the finger member 54, thus unlocking the handle 40 which he now raises into the dotted position, thereby rotating the levers 20, 21, about the axis 57 and causing the latch 19 to lift the bell crank 13, 15, releasing the roller 16 and therefore the bottom 10 of the hopper 9 when the contents are then dumped into the container 45.

During this lever movement the arm 23 is moved to the left by the link 22 and lock pin 25 passes freely through the hole 33 of the precision member 26 connected with the scale arm 30, these parts having been in proper register because of the correct weight in the hopper 9. The levers 20, 21, are mounted upon the shaft 57 which also carries the ratchet dog 90 with which the pawl 91 engages when the parts are in the full line position of Fig. 3. Pawl 91 is pivotally carried on the hub of the member 40 and a suitably fixed stop 92 is preferably introduced to limit the movement of the handle 40 by the projecting ears 93, 94, which engage against the stationary member 92 at the limits of said movement.

On the opposite end of the pawl 91 is the trip 95 which, when the handle 40 is raised to the dotted position, engages against the stop 92, thus disengaging the pawl 91 from the dog 56 and permitting the bell crank 20, loop 19, double lever 13, 15, to return to the full line position of Fig. 3, so that the roller 16 again locks against the arm 15 holding the bottom 10 in closed position against the hopper 9 and preventing any contents which may thereafter fall into the said hopper from passing into the container but retaining it as a contribution to the weighed material now again being fed into the hopper 9 from the belt 2.

When the handle 40 is returned to the full line position it is locked by the pin 53 as before and also it is to be noted that the pin 53 is retained in said locked engagement and may not be disengaged by the finger member 54 until a new container has engaged the trip 50 and removed the pin 51 from the slot 52. In this way any additions to the weight of the container after the contents have been properly weighed in the first place are prevented and any second unlocking of the bottom is prevented until the scale beam moves the precision lock into the proper position to permit a release of the parts as above described.

First, it will be noted that the movement of the handle 40 is dependent upon the correct registration of the precision lock 26 and pin 25. Second pin 53 must be disengaged from the hub of the lever 40 and this latter movement is dependent upon latch pin 51 and slot 52 under the control of the container and also upon the hand movement of the finger member 54, thus requiring the two hands of the operator. This has the advantage of preventing any probability of tampering of the scale parts during the weighing and dumping operations.

The counter balance weight 42 causes the double lever 13, 15 to return to full line position after the actuation of the latch 19.

The box or package into which the contents of hopper 9 are to be dumped, is shown at 45, which I prefer to bring into position on the conveyor rollers 46, 46, until it has arrived upon the hinged section 47 of the conveyor which is under the action of springs 48, and is there held in the position shown against the latch 50. The box will therefore be tilted into the full line position shown and will during its approach to final position, be caused to bump against the trip at 50, which in turn, withdraws the latch 51 from the groove or recess 52 in the bolt member 53, thus permitting the said bolt member to be retracted by withdrawing the handle 54 against the compression spring 55, thus unlocking the handle 40, on the axis 57. The purpose of this is to prevent any movement of the handle 40, and consequently any dumping from the hopper 9 unless the box 45 is in position to receive the contents from the hopper.

To insure correct weighing I prefer to require the operator to employ both hands for the dumping operation, and therefore to operate the finger member 54 and the handle 40 simultaneously, when it is desired to dump the contents from the hopper, and after the handle 40 returns to its full line position, after its dumping operation, the bolt 53 locks the handle 40 requiring another operation of the finger member 54 before the handle 40 can be again operated, and this movement cannot be made unless latch 51 has been withdrawn from the groove 52 by another box or container in the position 45 against the bell crank 50 and a correct position of the precision lock 26 has been reached.

At 60 is a shield member or cover extending over the operating parts of the scales to protect them against interference or damage.

Opposite the feeding belt 2 I prefer to arrange a pocket 61 in which an extra quantity of the material being packed may be kept for the convenience of the operator to bring up an accurate adjustment of the weight of the contents by feeding manually therefrom after he has ceased to operate the belt 2.

Reference is herein made to co-pending application No. 437,078, filed Jan. 13, 1921, wherein is set forth another form of automatic feeding mechanism which may be employed to feed material into the hopper 9 automatically, and with great accuracy, independent of manual labor.

Figure 2:
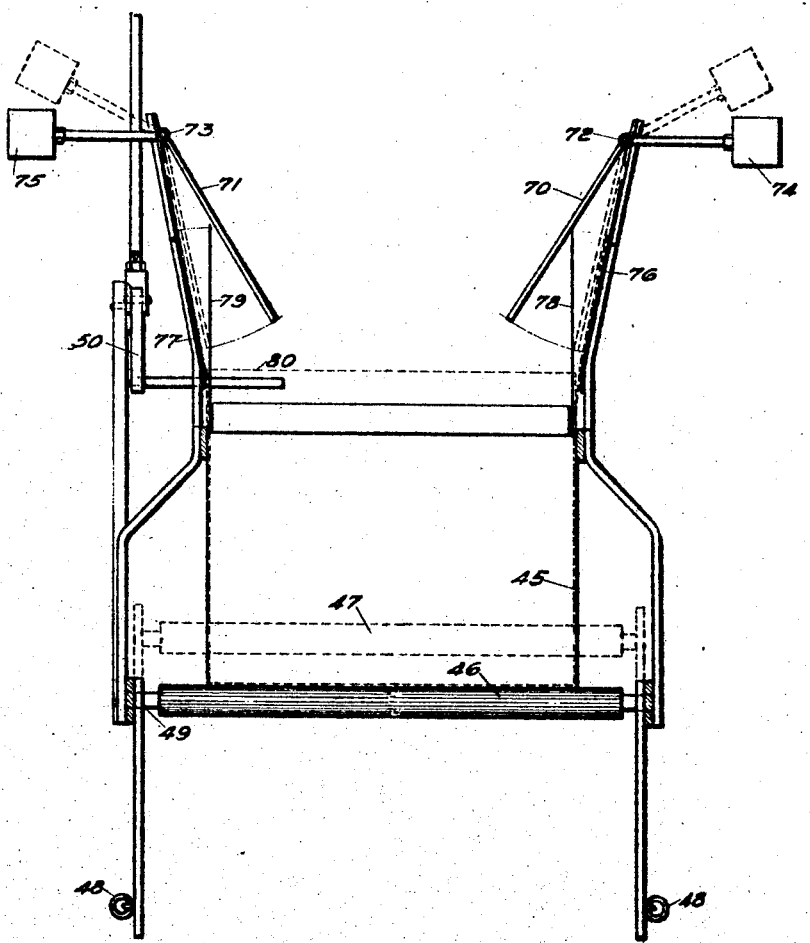
Fig. 2 is a cross section of Fig. 1 on the line II—II thereof.
Figure 6:
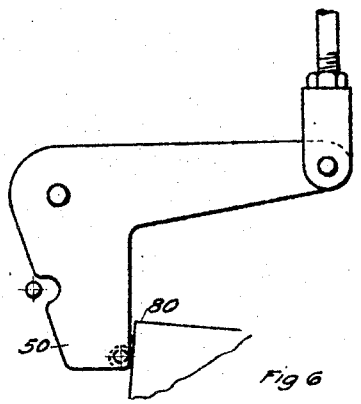
Fig. 6 is an enlarged view of parts of the box engaging mechanism of Fig. 1.

At 70, 71, are shown a pair of wings pivoted at 72, 73, respectively and normally counter weighed at 74, 75, so that they occupy the full line position shown in Fig. 2. At 76, 77, are a pair of stationary plates above the adjacent edges of the box or container 45. In the packing of raisins and most other commodities it is desirable to introduce into the said box a paper liner, which, until the contents are introduced into the box 45, extends above, as shown at 78, 79, and as the box 45 with its paper liner comes into the position of Fig. 1, the projecting paper sides 78, 79, pass between the wings 70 and plate 76 and the wing 71 and plate 77, respectively, and when the contents are dumped from the hopper 9, falling against the plates 70, 71, they are caused to move downward into their dotted positions, pressing out the paper sides 78, 79, so that the contents freely enter the package within the paper lining.

After the hopper 9 has been entirely dumped, the bottom 10 returns to its normal closed position and the wings 70, 71, under the action of their counter balance weights 74, 75, return to their full line positions, see Fig. 2. The weight of the box with its added contents, now depress the hinged conveyor section when the upper corner 80 of the said box then clears under the crank 50 and the box continues downward on the train of rollers 46, 46, and a new box 81, now moves into position.

I claim:

1. In manually operated weighing apparatus, conveyor means adapted to deliver material to be packed into a hopper, a scale and a hopper suspended from said scale, a movable bottom to said hopper, a lock in combination with the scale adapted to normally retain said bottom in closed position and connections comprising two simultaneously hand operable devices adapted to release said lock only when the scale position is in accord with a predetermined weight of material in the hopper.

2. In weighing apparatus the combination as set forth in claim 1 and means restraining the operation of said connections to release the lock, and parts actuated by a container only when positioned under said hopper to release the restraining means and thus permit the said connections to release the lock.

3. In manually operable weighing apparatus, a scale and a hopper suspended from said scale, a movable bottom for said hopper, a lock in combination with the said scale adapted to normally retain said bottom in closed position, and connections including simultaneously operable hand devices for both hands of the operator adapted to release said lock, and means preventing the actuation of said devices by the scale until the scale corresponds with a predetermined weight of material in the hopper when said means permit the actuation of said devices.

4. Apparatus as set forth in claim 1 in combination with mechanism for delivering a container under said hopper and means holding said container in a raised position when the container is empty and said means to be depressed by said container when the container is filled with material to the predetermined weight whereby the container is permitted to move out of said position and clear of said restraining means.

5. Apparatus as set forth in claim 2 in combination with mechanism for delivering a container under said hopper and means holding said container in a raised position when the container is empty and said means to be depressed by said container when the container is filled with material to the predetermined weight whereby the container is permitted to move out of said position and clear of said restraining means.

6. Apparatus as set forth in claim 3 in combination with mechanism for delivering a container under said hopper and means holding said container in a raised position when the container is empty and said means to be depressed by said container when the container is filled with material to the predetermined weight whereby the container is permitted to move out of said position and clear of said restraining means.

GUY B. McLEAN.